(12) United States Patent
Miyamoto

(10) Patent No.: US 8,125,575 B2
(45) Date of Patent: Feb. 28, 2012

(54) LIQUID CRYSTAL TELEVISION AND BACKLIGHT UNIT

(75) Inventor: Hitoshi Miyamoto, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1006 days.

(21) Appl. No.: 12/079,655

(22) Filed: Mar. 28, 2008

(65) Prior Publication Data

US 2008/0252796 A1    Oct. 16, 2008

(30) Foreign Application Priority Data

Apr. 12, 2007   (JP) ................ 2007-104987

(51) Int. Cl.
*H04N 3/14* (2006.01)
*G09G 3/36* (2006.01)
(52) U.S. Cl. ............ 348/790; 345/50; 345/87; 345/102
(58) Field of Classification Search .......... 348/790; 315/246; 345/50, 84, 87, 102
See application file for complete search history.

(56) References Cited

U.S. PATENT DOCUMENTS

| | | | |
|---|---|---|---|
| 2005/0127848 A1* | 6/2005 | Park et al. .......... | 315/209 R |
| 2005/0140312 A1* | 6/2005 | Nishinosono et al. ....... | 315/224 |
| 2005/0156534 A1* | 7/2005 | Oh ................ | 315/247 |
| 2005/0281037 A1* | 12/2005 | Murakami et al. .......... | 362/382 |
| 2006/0017852 A1* | 1/2006 | Iwaki .......... | 348/581 |

FOREIGN PATENT DOCUMENTS

| | | |
|---|---|---|
| JP | S51-148886 U | 11/1976 |
| JP | S58-165292 A | 9/1983 |
| JP | 2001-110583 A | 4/2001 |
| JP | 2005-005059 | 1/2005 |
| JP | 2005-190835 | 7/2005 |
| JP | 2005-190835 A | 7/2005 |

OTHER PUBLICATIONS

Japanese Notice of the reason for refusal, dated Dec. 3, 2008.

* cited by examiner

*Primary Examiner* — Brian Pendleton
*Assistant Examiner* — Nnenna Ekpo
(74) *Attorney, Agent, or Firm* — Yokoi & Co., U.S.A., Inc.; Toshiyuki Yokoi

(57) ABSTRACT

A liquid crystal television 100 displays an image on a liquid crystal display by transmitting a light source from a backlight unit 10. The backlight unit 10 drives two cold-cathode tubes 13a, 13b as the backlight 13 at the high frequency voltages each with different polarity generated by a self-excited inverter circuit 11 to generate a light source. The backlight unit 10 connects an inter-lamp coil L2 between two U-shaped cold-cathode tubes 13a, 13b to form a series circuit, and further connects capacitors C5, C6 in parallel with the cold-cathode tubes 13a, 13b.

5 Claims, 5 Drawing Sheets

RELATED ART

LIQUID CRYSTAL TELEVISION AND BACKLIGHT UNIT

CROSS-REFERENCES TO RELATED APPLICATIONS

The present application is related to the Japanese Patent Application No. 2007-104987, filed Apr. 12, 2007, the entire disclosure of which is expressly incorporated by reference herein.

BACKGROUND OF THE INVENTION

1. Field of the Invention

The present invention relates to a backlight unit which feeds power to a cold-cathode tube, and more particularly to a backlight unit which feeds power to a plurality of cold-cathode tubes connected in series from a single inverter circuit transformer, and further relates to a liquid crystal television which employs the backlight unit.

2. Description of Related Art

Generally, the backlight unit for driving the backlight which illuminates the liquid crystal display from the back side has been well known. The backlight unit feeds AC power generated by the separately-excited or self-excited inverter circuit transformer to the backlight so as to be illuminated.

Japanese Unexamined Patent Application Publication No. 2005-5059 discloses the backlight unit which employs at least two cold-cathode tubes as the backlight, each of which receives power from the single inverter circuit transformer.

Japanese Unexamined Patent Application Publication No. 2005-190835 discloses that the single self-excited inverter circuit transformer feeds power to two cold-cathode tubes connected in series.

In the technology disclosed in Japanese Unexamined Patent Application Publication No. 2005-5059, the number of the inverter circuit transformers has to be increased in accordance with the number of the cold-cathode tubes, which results in the cost increase.

In the technology disclosed in Japanese Unexamined Patent Application Publication No. 2005-190835, variation in the tube current fed to the cold-cathode tube may result in uneven luminance. Even if the constant electromotive force is applied to the secondary coil of the inverter circuit transformer, the variation in the value of the tube current applied through the cold-cathode tube may make the light emitting luminance uneven. As shown in FIG. 5A, two cold-cathode tubes RL1 and RL2 are vertically arranged. When the tube current is applied from the RL1 to RL2, the lower portion of the backlight 1 has the higher luminance than that of the upper portion as shown in FIG. 5B, causing the luminance gradient. This may result in the uneven luminance of the liquid crystal display, and accordingly, the viewer may feel uncomfortable with the view of the display.

BRIEF SUMMARY OF THE INVENTION

It is an object of the present invention to provide a backlight unit for feeding power to the cold-cathode tubes connected in series from the single inverter circuit transformer, which is capable of suppressing the unevenness of the luminance of the cold-cathode tube, and also to provide a liquid crystal television which employs the backlight unit.

According to an aspect of the present invention, a backlight unit that drives a plurality of cold-cathode tubes at high frequency voltages each with a different polarity generated by a self-excited inverter circuit comprising: a series circuit formed by connecting an inter-lamp coil between the cold-cathode tubes in series.

In the above-structured backlight unit, the series circuit is formed by connecting the inter-lamp coil in series between the cold-cathode tubes. When the tube current applied to one of the cold-cathode tubes is about to rise up, such increase in the tube current may be suppressed by the inter-lamp coil under the electromotive force. This makes it possible to make the difference in the luminance between the cold-cathode tubes uniform, thus preventing the unevenness in the luminance such as the luminance gradient of the backlight.

According to another aspect of the present invention, in a backlight unit which drives a plurality of cold-cathode tubes at high frequency voltages each with a different polarity generated by a self-excited inverter circuit, a plurality of capacitors each with a capacitance which is at least higher than that of the cold-cathode tube are connected in parallel with the cold-cathode tubes.

In the above-structured backlight unit, the variation in the capacitance of the cold-cathode tube may be absorbed by the capacitance of the capacitors connected in parallel. The pressure difference between two cold-cathode tubes may be reduced to suppress the difference in the tube current. This makes it possible to suppress the luminance difference between the two cold-cathode tubes, thus preventing the unevenness in the luminance such as the luminance gradient.

The cold-cathode tube is preferably formed into a U-shape.

The aforementioned backlight unit which employs the U-shaped cold-cathode tube may provide the effects of the present invention.

According to another aspect of the present invention, a liquid crystal television includes a tuner module for receiving a predetermined channel from a television broadcast signal, a liquid crystal display for displaying an image based on the received television broadcast signal by transmitting light rays, and a backlight unit provided with a first and a second U-shaped cold-cathode tubes for irradiating the light rays onto a backside of the liquid crystal display, a transformer, and a self-excited inverter circuit. The backlight unit connects the first U-shaped cold-cathode tube to one output terminal of a secondary coil of the transformer, and connects the second U-shaped cold-cathode tube to the other output terminal. An inter-lamp coil is connected between the first and the second U-shaped cold-cathode tubes to form a series circuit. A first capacitor and a second capacitor each having an equal capacitance which is at least higher than that of the cold-cathode tube are connected to the first and the second cold-cathode tubes in parallel, respectively. When a high frequency voltage generated by the self-excited inverter circuit is applied to the transformer to illuminate the first and the second cold-cathode tubes, a difference in an applied tube current between the first and the second cold-cathode tubes is reduced.

BRIEF DESCRIPTION OF THE DRAWINGS

It is to be understood that the drawings are to be used for the purpose of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF THE INVENTION

The detailed description set forth below in connection with the appended drawings is intended as description of presently preferred embodiments of the invention and is not intended to represent the only forms in which the present invention may be constructed and or utilized.

An embodiment and the modified examples according to the present invention will be described with respect to the sections in the following order.
(1) Structure of the liquid crystal television
(2) Structure of the backlight unit
(3) Function and effects of the backlight unit
(4) Modified examples
(5) Outline (1) Structure of the Liquid Crystal Television A liquid crystal television displays an image on a liquid crystal display based on the received television broadcast. The liquid crystal display displays the image by transmitting light rays irradiated from the backlight unit onto the back side. The backlight unit generates a light source by driving two U-shaped cold-cathode tubes connected in series as a backlight at the high frequency voltages with different polarities generated by a self-excited inverter circuit. The backlight unit according to the present invention serves to suppress unevenness in the luminance of the liquid crystal display by reducing the difference in the tube current between the two U-shaped cold-cathode tubes.

Figure 1:
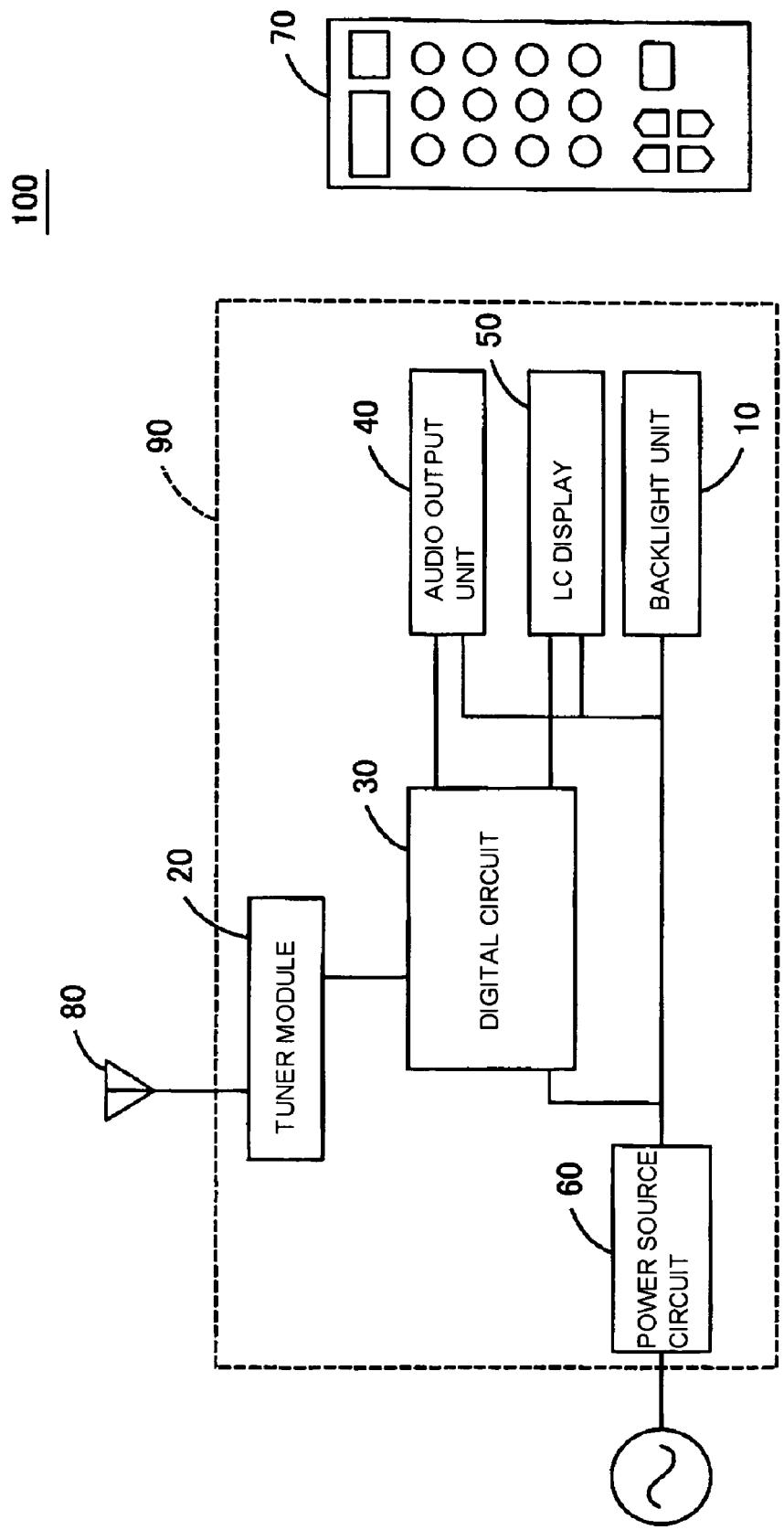
FIG. 1 is a block diagram of a liquid crystal television as an example of the present invention.

Referring to FIG. 1, a liquid crystal television 100 includes a receiver 90 and a remote controller 70. The receiver 90 includes a tuner module 20, a digital circuit 30, an audio output unit 40, a liquid crystal display 50, a power source circuit 60, and a backlight unit 10. The tuner module 20 serves to detect the TV broadcast signal received by an antenna 80 based on the channel selected by the remote controller 70. The tuner module 20 obtains the image signal and the audio signal from the detected TV broadcast signal so as to be output to the digital circuit 30. The digital circuit 30 subjects the image and audio signals to the predetermined signal processing such that the image signal is output to the liquid crystal display 50 and the audio signal is output to the audio output unit 40, respectively. The liquid crystal display 50 changes the transmittance of the light rays irradiated from the backlight unit 10 to display the image. The backlight unit 10 illuminates upon reception of power from the power source circuit 60.

(2) Structure of the Backlight Unit

Figure 2:
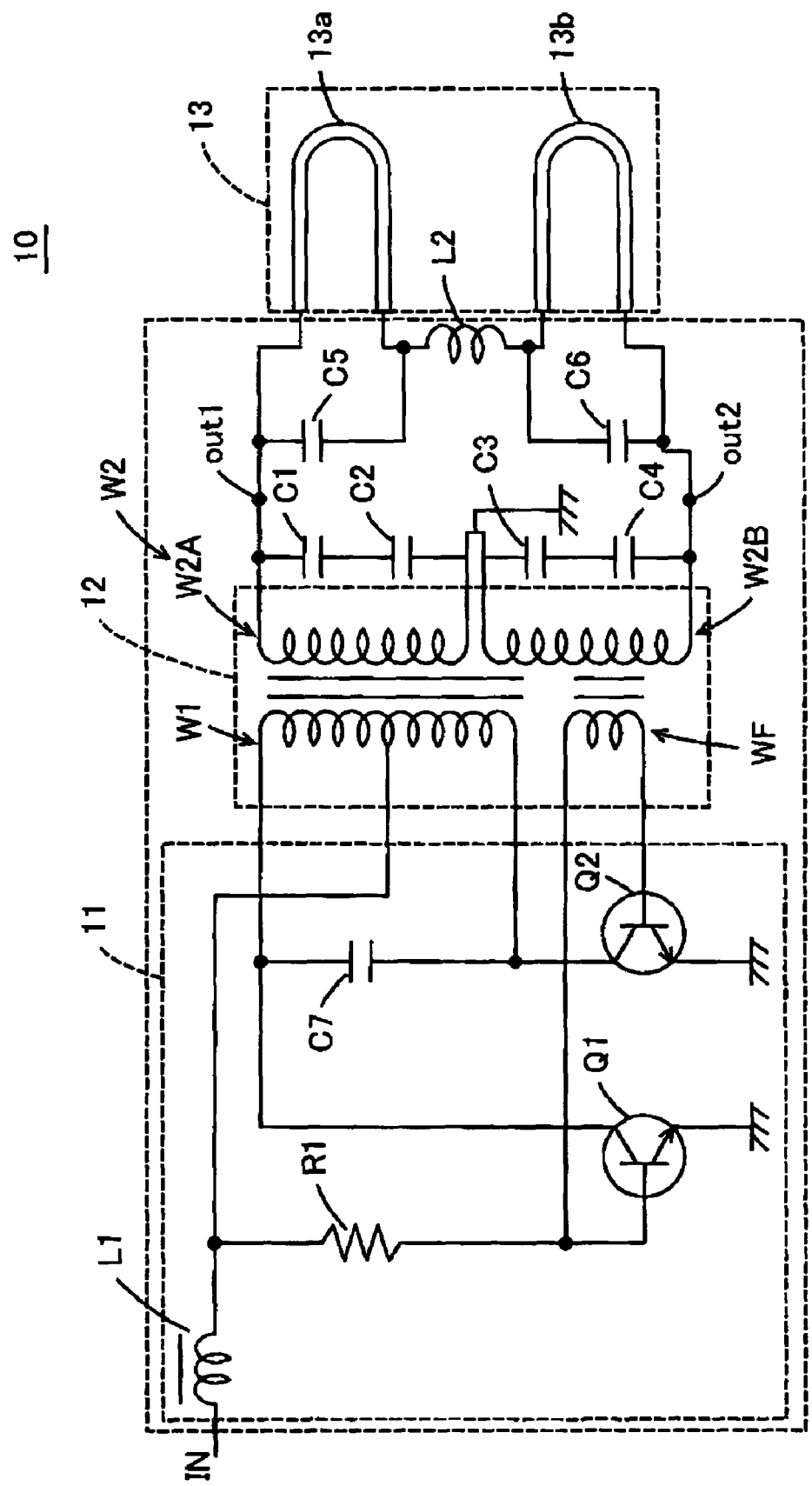
FIG. 2 is a view showing a backlight unit as an example of the present invention.

The backlight unit 10 functions in illuminating two cold-cathode tubes connected in series as the backlight at high frequency voltages with different polarities generated by the self-excited inverter circuit. Referring to FIG. 2, the backlight unit 10 includes a self-excited oscillation inverter circuit 11, a transformer 12, and a backlight 13. The inverter circuit 11 includes transistors Q1 and Q2 connected to the push-pull, a bias resistance R1, and a resonance capacitor C7 connected to the primary side of the transformer 12 in parallel. The transformer 12 includes a primary coil W1, a return coil WF, and a secondary coil W2. An intermediate tap of the primary coil W1 is connected to an input terminal IN via a choke coil L1. The secondary coil W2 is divided into a first section W2A and a second section W2B, and has its center point grounded. The secondary coil W2 is connected to ballast capacitors C1, C2, C3 and C4 in parallel. The backlight 13 includes two U-shaped cold-cathode tubes 13a and 13b, and connected to one terminal out1 and the other terminal out2 in series, respectively. An inter-lamp coil L2 is connected to the cold-cathode tubes 13a and 13b in series there between to form the series circuit.

When the DC voltage rectified in the power source circuit 60 is applied to the input terminal IN, the inverter circuit 11 oscillates in the self-excited manner as the current from the return coil WF is alternately applied to the transistors Q1 and Q2. Then the current flowing from the intermediate tap to one side of the primary coil W1 and the current flowing to the other side of the primary coil W1 are switched ON/OFF alternately to allow the secondary coil W2 to generate the high frequency voltage. In other words, the equivalent high frequency voltages each with different polarity are generated at both terminals out1 and out2 of the secondary coil W2. The thus generated high frequency voltage allows the cold-cathode tubes 13a and 13b to generate the tube current to start illuminating.

The backlight unit 10 reduces the difference in the tube current between the two U-shaped cold-cathode tubes 13a and 13b to suppress the unevenness in the luminance of the liquid crystal display 50. In the liquid crystal television 100 according to the present invention, the inter-lamp coil L2 is connected between the cold-cathode tubes 13a and 13b in series to form the series circuit. The capacitors C5 and C6 are connected to the cold-cathode tubes 13a and 13b in parallel to reduce the difference in the applied tube current between the cold-cathode tubes 13a and 13b. This makes it possible to reduce the difference in the light emitting luminance between the cold-cathode tubes 13a and 13b resulting from the difference in the tube current. Accordingly, the unevenness in the luminance of the liquid crystal display 50 may be suppressed.

The inter-lamp coil L2 serves to reduce the difference in the tube current between the cold-cathode tubes 13a and 13b. When the tube currents of the cold-cathode tubes 13a and 13b are about to rise up upon reception of the power fed from the secondary coil W2, the change in the currents in the cold-cathode tubes 13a and 13b occurs. The inter-lamp coil L2 generates the induced electromotive force so as to prevent the increase in the tube current. This makes it possible to keep the difference in the tube current between the cold-cathode tubes 13a and 13b uniform.

The experiment of the difference in the tube current was performed in the absence/presence of the inter-lamp coil L2 under the following conditions. The inter-lamp coil L2 was set to 220 μH, and the voltage of 23V was input to the input terminal IN to measure the difference in the tube current between the cold-cathode tubes 13a and 13b. In the aforementioned experiment, the difference in the tube current in the backlight unit with no inter-lamp coil L2 measured 2.0 mA. Meanwhile, the difference in the tube current in the backlight unit with the inter-lamp coil L2 measured 1.0 mA.

The capacitors C5 and C6 serves to reduce the difference in the tube current between the cold-cathode tubes 13a and 13b connected in parallel with the capacitors C5 and C6. Each of the capacitors C5 and C6 has equal capacitance which is at least higher than that of the cold-cathode tube. Each capacitance of the cold-cathode tubes 13a and 13b is much lower than each capacitance of the capacitors C5 and C6. So the variation in each capacitance of the cold-cathode tubes 13a and 13b may be absorbed by connecting the capacitors C5 and C6 in parallel with the cold-cathode tubes 13a and 13b. As each capacitance of the capacitors C5 and C6 is substantially equal, the combined capacitance of the cold-cathode tube 13a and the capacitor C5 becomes substantially the same value as that of the combined capacitance of the cold-cathode tube 13b and the capacitor C6. Accordingly, each high frequency voltage of the cold-cathode tubes 13a and 13b becomes constant, reducing the difference in the applied tube current between the cold-cathode tubes 13a and 13b.

(3) Function and Effects of the Backlight Unit

The liquid crystal television 100 provided with the backlight unit 10 according to the present invention serves to reduce the difference in the applied tube current between the two cold-cathode tubes 13a and 13b so as to suppress the unevenness in the luminance of the backlight 13. The backlight unit 10 is allowed to illuminate the liquid crystal display 50 from the backside with the uniform luminance to suppress the unevenness in the luminance of the liquid crystal display 50.

(4) Modified Examples

The liquid crystal television 100 may be modified into various forms.

Figure 3:
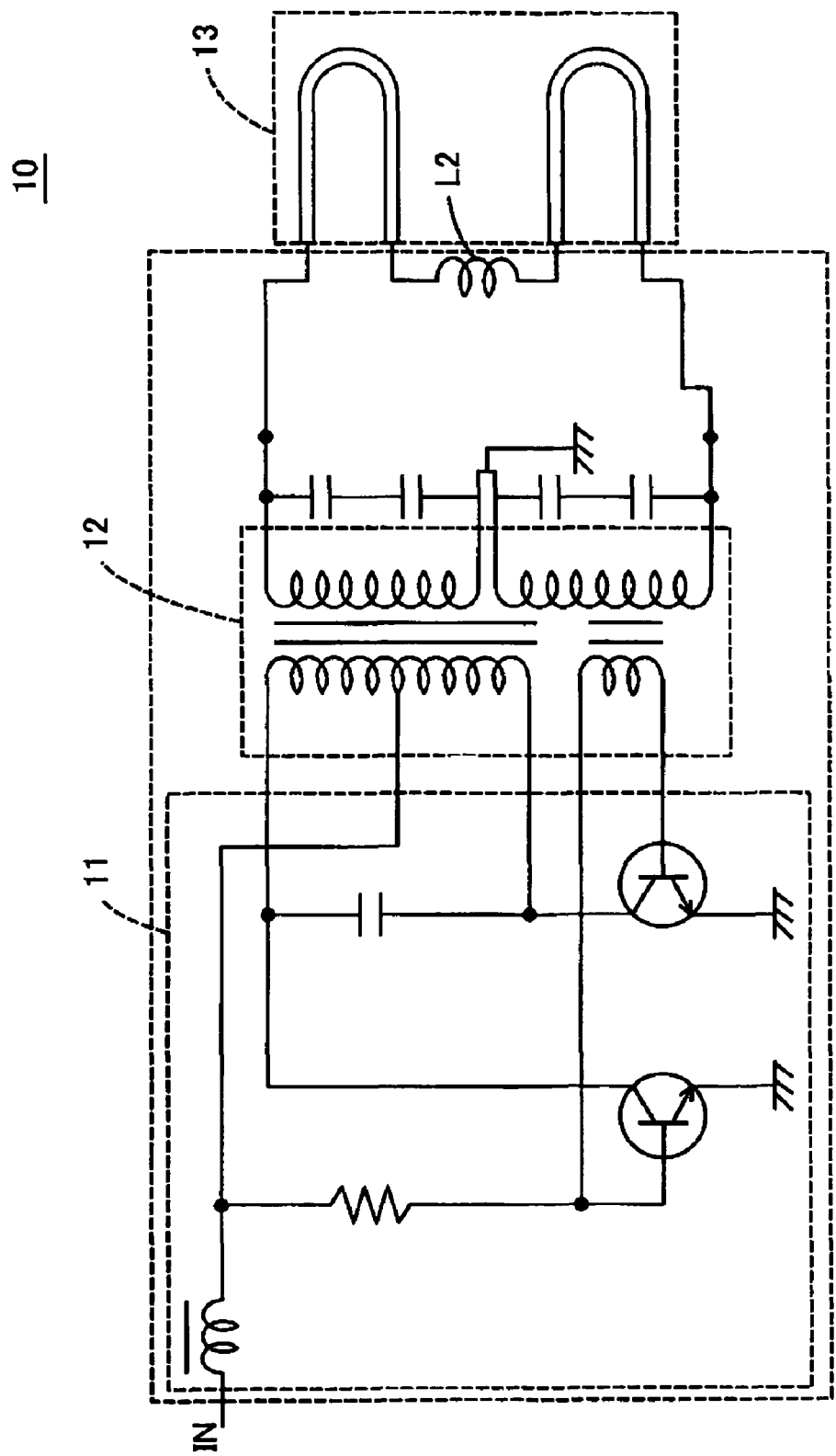
FIG. 3 is a view showing a backlight unit as another example of the present invention.
Figure 4:
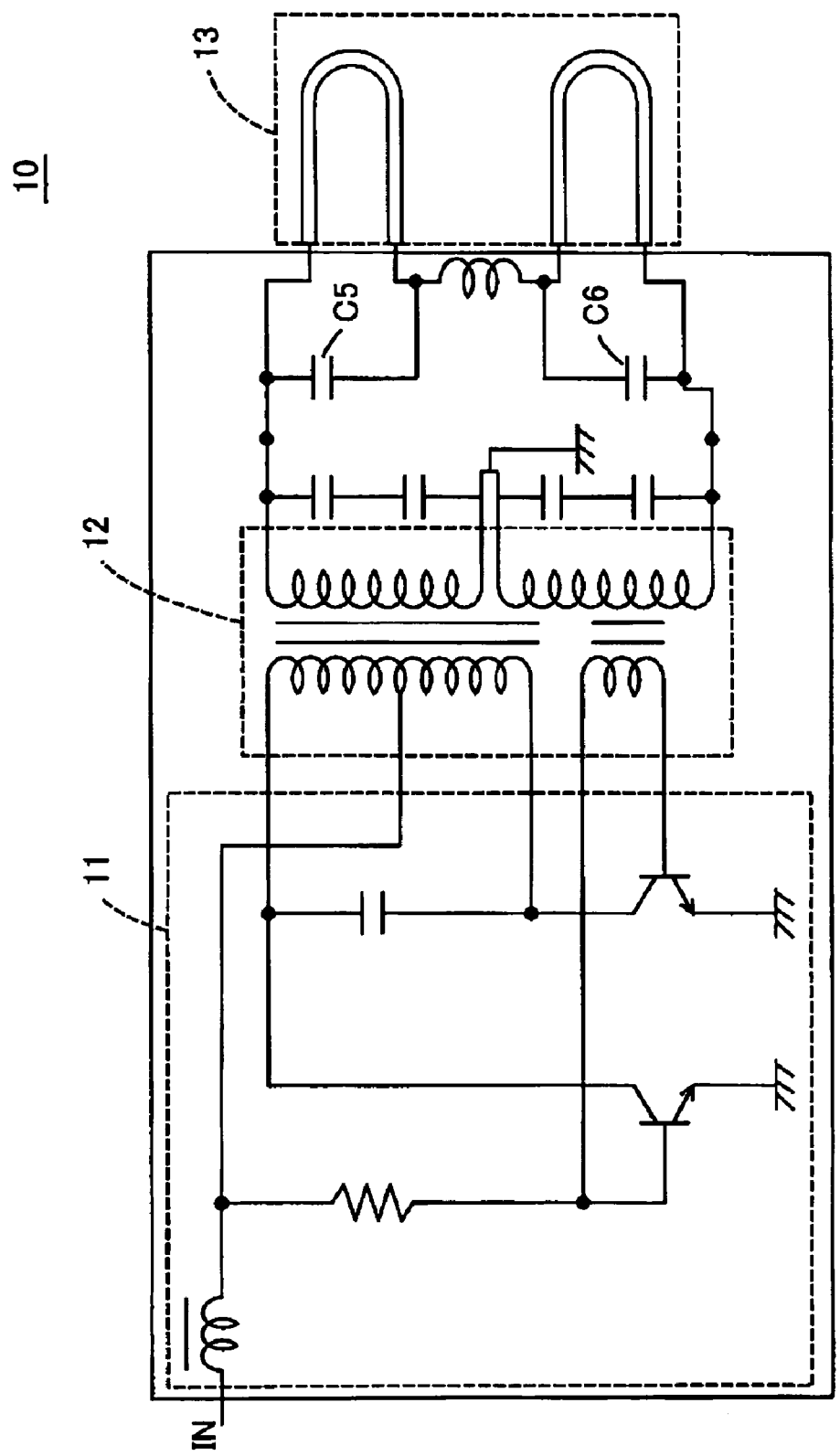
FIG. 4 is a view showing a backlight unit as another example of the present invention.
Figure 5A:
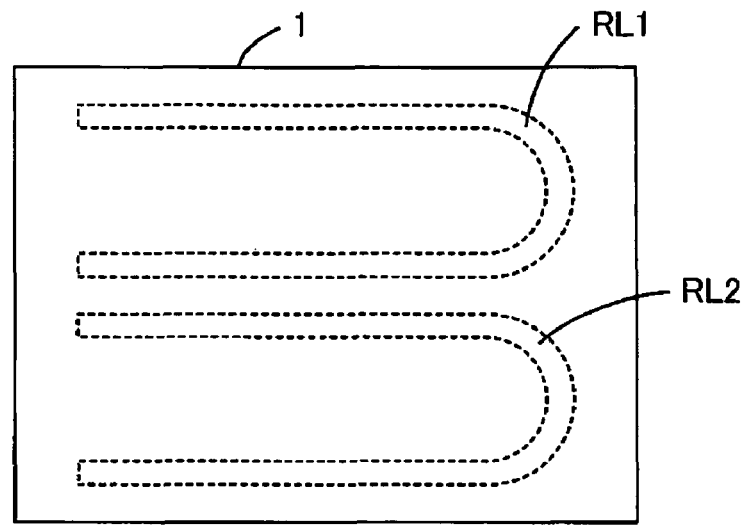
FIG. 5A and FIG. 5B show the luminance value of an employed liquid crystal panel.
Figure 5B:
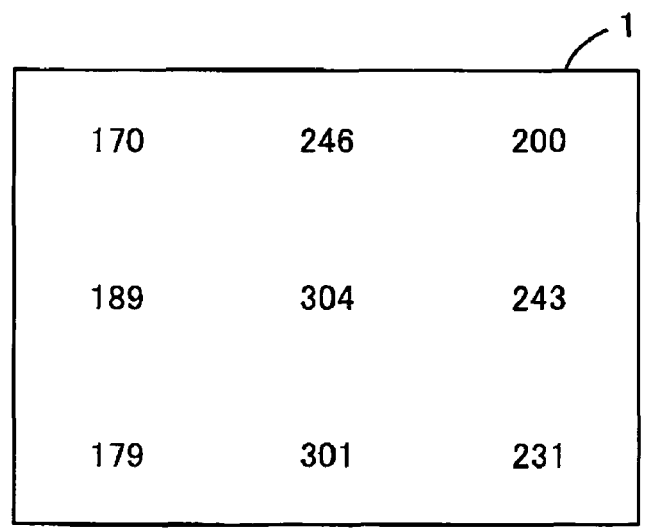

Referring to FIG. 3, only the inter-lamp coil L2 may be connected to the cold-cathode tubes 13a and 13b for reducing the difference in the tube current therebetween. Referring to FIG. 4, only the capacitors C5 and C6 may be connected in parallel with the cold-cathode tubes 13a and 13b for reducing the difference in the tube current therebetween.

The quasi-U-like tubes or straight tubes may be employed instead of the U-shaped cold-cathode tubes 13a and 13b.

(5) Outline

The liquid crystal television 100 displays the image on the liquid crystal display 50 based on the received TV broadcast. The liquid crystal display 50 displays the video image by transmitting the light source from the backlight unit 10. The backlight unit 10 drives the two cold-cathode tubes 13a and 13b connected in series as the backlight 13 at high frequency voltages with different polarities generated by the self-excited inverter circuit 11 to generate the light source. The backlight unit 10 according to the present invention reduces the difference in the applied tube current between the two U-shaped cold-cathode tubes so as to suppress unevenness in the luminance of the liquid crystal display 50.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A backlight unit that drives a plurality of cold-cathode tubes at high frequency voltages each with a different polarity comprising:

a self-excited inverter circuit that generates the high frequency voltages, a transformer that includes a primary coil connected to the self-excited inverter circuit and a secondary coil, and a series circuit that is connected between both ends of the secondary coil of the transformer and formed by the plurality of cold-cathode tubes, wherein the series circuit is comprised of the plurality of cold cathode tubes and an inter lamp coil that is connected between the cold cathode tubes in series.

2. The backlight unit according to claim 1, wherein each cold-cathode tube is formed to have a U-shape.

3. A backlight unit that drives a plurality of cold-cathode tubes at high frequency voltages each with a different polarity comprising:

a self-excited inverter circuit that generates the high frequency voltages, a transformer that includes a primary coil connected to the self-excited inverter circuit and a secondary coil, and the plurality of cold-cathode tubes that is connected in series between both ends of the secondary coil, wherein a plurality of capacitors each with a capacitance that is at least higher than that of the cold-cathode tube are connected to both terminators of each cold-cathode tube in parallel.

4. The backlight unit according to claim 3, wherein each cold-cathode tube is formed to have a U-shape.

5. A liquid crystal television, comprising:

a tuner module for receiving a predetermined channel from a television broadcast signal;

a liquid crystal display for displaying an image based on the received television broadcast signal by transmitting light rays; and a backlight unit provided with a first and a second U-shaped cold-cathode tubes for irradiating the light rays onto a backside of the liquid crystal display, a transformer, and a self-excited inverter circuit;

the backlight unit couples the first U-shaped cold-cathode tube with one output terminal of a secondary coil of the transformer, and couples the second U-shaped cold-cathode tube with another output terminal;

an inter-lamp coil is connected between the first and the second U-shaped cold-cathode tubes to form a series circuit;

a first capacitor and a second capacitor each having an equal capacitance that is at least higher than that of the cold-cathode tube are connected to both terminators of the first and the second cold-cathode tubes in parallel, respectively; and when a high frequency voltage generated by the self-excited inverter circuit is applied to the transformer to illuminate the first and the second cold-cathode tubes, a difference in an applied tube current between the first and the second cold-cathode tubes is reduced.

* * * * *